US012762723B2

(12) United States Patent
Campagnolo Guizilini et al.

(10) Patent No.: US 12,762,723 B2
(45) Date of Patent: Oct. 13, 2026

(54) SYSTEMS AND METHODS FOR PREDICTING A DEPTH MAP USING DIFFUSION-BASED MODELING

(71) Applicant: Toyota Research Institute, Inc., Los Altos, CA (US)

(72) Inventors: Vitor Campagnolo Guizilini, Santa Clara, CA (US); Achal Dave, San Francisco, CA (US); Pavel Tokmakov, West Hollywood, CA (US); Rares A. Ambrus, San Francisco, CA (US)

(73) Assignees: Toyota Research institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 18/776,805

(22) Filed: Jul. 18, 2024

(65) Prior Publication Data

US 2025/0285301 A1 Sep. 11, 2025

Related U.S. Application Data

(60) Provisional application No. 63/561,479, filed on Mar. 5, 2024.

(51) Int. Cl.

*G06T 7/50* (2017.01)
*G06T 7/00* (2017.01)

(Continued)

(52) U.S. Cl.

CPC .............. *G06T 7/50* (2017.01); *G06T 7/0002* (2013.01); *G06T 7/60* (2013.01); *G06T 7/73* (2017.01); *G06T 2207/20081* (2013.01)

(58) Field of Classification Search

CPC ........... G06T 7/50; G06T 7/0002; G06T 7/60; G06T 7/73; G06T 2207/20081; G06T 2207/20084

See application file for complete search history.

(56) References Cited

U.S. PATENT DOCUMENTS

2015/0371395 A1* 12/2015 Sendik .................... G06T 7/215 382/190

2021/0209388 A1 7/2021 Ciftci et al.

FOREIGN PATENT DOCUMENTS

CN 111462130 A 7/2020

OTHER PUBLICATIONS

Kanai et al., "Robust self-supervised extrinsic self-calibration," 2023 IEEE/RSJ International Conference on Intelligent Robots and Systems (IROS), Detroit, MI, USA, 2023, pp. 1932-1939.

(Continued)

*Primary Examiner* — Stephen R Koziol
*Assistant Examiner* — Michael Kim Maiden
(74) *Attorney, Agent, or Firm* — Christopher G. Darrow; Darrow Mustafa PC

(57) ABSTRACT

System, methods, and other embodiments described herein relate to estimating a depth map from an image using a diffusion model that efficiently learns in optimal computational spaces using a learning model and trains with sparse data. In one embodiment, a method includes estimating a local vector for an image by combining random noise, an image embedding about the image, and a geometric embedding using a learning model, the local vector having depth information at a pixel-level for the image. The method also includes predicting a global vector by combining the image embedding and the geometric embedding at a scene-level by the learning model. The method also includes inferring a depth map of the image by combining the local vector and the global vector using a diffusion model.

20 Claims, 5 Drawing Sheets

(51) Int. Cl.
*G06T 7/60* (2017.01)
*G06T 7/73* (2017.01)

(56) References Cited

OTHER PUBLICATIONS

Ke et al., "Repurposing diffusion-based image generators for monocular depth estimation," Proceedings of the IEEE/CVF Conference on Computer Vision and Pattern Recognition (CVPR), 2024, pp. 9492-9502.
Kim et al., "Self-supervised surround-view depth estimation with volumetric feature fusion," In: Advances in Neural Information Processing Systems, 2022, pp. 1-14.
Kusupati et al., "Normal assisted stereo depth estimation," Proceedings of the IEEE/CVF Conference on Computer Vision and Pattern Recognition (CVPR), 2020, pp. 2189-2199.
Lee et al., "From big to small: Multi-scale local planar guidance for monocular depth estimation," arXiv:1907.10326, Sep. 23, 2021, pp. 1-11.
Li et al., "Structdepth: Leveraging the structural regularities for self-supervised indoor depth estimation," Proceedings of the IEEE/CVF International Conference on Computer Vision (ICCV), 2021, pp. 12663-12673.
Liu et al., "Zero-1-to-3: Zero-shot one image to 3d object," Proceedings of the IEEE/CVF International Conference on Computer Vision (ICCV), 2023, pp. 9298-9309.
Liu et al., "Self-supervised learning for dense depth estimation in monocular endoscopy," In: OR 2.0 Context-Aware Operating Theaters, Computer Assisted Robotic Endoscopy, Clinical Image-Based Procedures, and Skin Image Analysis, 2018, pp. 128-138.
Mildenhall et al., "NeRF: Representing scenes as neural radiance fields for view synthesis," In: Proceedings of the European Conference on Computer Vision (ECCV), 2020, pp. 405-421.
Silberman et al., "Indoor segmentation and support inference from rgbd images," In: ECCV, 2012, pp. 1-14.
Nichol et al., "Improved denoising diffusion probabilistic models," Proceedings of the 38th International Conference on Machine Learning, PMLR 139, pp. 8162-8171.
Van Den Oord et al., "Neural discrete representation learning," Advances in Neural Information Processing Systems, vol. 30. Curran Associates, Inc., 2017, pp. 1-10.
Ranftl et al., "Towards robust monocular depth estimation: Mixing datasets for zero-shot cross-dataset transfer," IEEE Transactions on Pattern Analysis and Machine Intelligence, vol. 44, No. 3, 2022, pp. 1623-1637.
Rombach et al., "High-resolution image synthesis with latent diffusion models," Proceedings of the IEEE/CVF Conference on Computer Vision and Pattern Recognition (CVPR), 2022, pp. 10684-10695.
Ronneberger et al., "U-net: Convolutional networks for biomedical image segmentation," In: MICCAI, Springer, 2015, pp. 1-8.
Saharia et al., "Palette: Image-to-image diffusion models," In: SIGGRAPH, 2022, article No. 15, pp. 1-10.
Saxena et al., "The surprising effectiveness of diffusion models for optical flow and monocular depth estimation," In: Thirty-seventh Conference on Neural Information Processing Systems, 2023, pp. 1-27.
Saxena et al., "Zero-shot metric depth with a field-of-view conditioned diffusion model," arXiv:2312.13252, 2023, pp. 1-12.
Saxena et al., "Monocular depth estimation using diffusion models," arXiv:2302.14816, 2023, pp. 1-15.
Shu et al., "Feature-metric loss for self-supervised learning of depth and egomotion," In: ECCV, 2020, pp. 1-16.
Sohl-Dickstein et al., "Deep unsupervised learning using nonequilibrium thermodynamics," Proceedings of the 32nd International Conference on Machine Learning, PMLR 37, 2015, pp. 2256-2265.
Song et al., "Denoising diffusion implicit models," ICLR 2021, pp. 1-22.
Song et al., "SUN RGB-D: scene understanding benchmark suite," Proceedings of the IEEE Conference on Computer Vision and Pattern Recognition (CVPR), 2015, pp. 567-576.
Song et al., "Score based generative modeling through stochastic differential equations," In: International Conference on Learning Representations, 2021, pp. 1-36.
Srivastava et al., "Dropout: a simple way to prevent neural networks from overfitting," Journal of Machine Learning Research, 2014, pp. 1929-1958.
Sturm et al., "A benchmark for the evaluation of RGB-D slam systems," 2012 IEEE/RSJ International Conference on Intelligent Robots and Systems, Vilamoura-Algarve, Portugal, 2012, pp. 573-580.
Sun et al., "Scalability in perception for autonomous driving: Waymo open dataset," In: Proceedings of the IEEE/CVF conference on computer vision and pattern recognition, 2020, pp. 2446-2454.
Swami et al., "Do what you can, with what you have: Scale-aware and high quality monocular depth estimation without real world labels," Proceedings of the IEEE/CVF Conference on Computer Vision and Pattern Recognition (CVPR) Workshops, 2022, pp. 988-997.
Ummenhofer et al., "Demon: Depth and motion network for learning monocular stereo," Proceedings of the IEEE Conference on Computer Vision and Pattern Recognition (CVPR), 2017, pp. 5038-5047.
Vasiljevic et al., "DIODE: A Dense Indoor and Outdoor DEpth Dataset," arXiv:1908.00463, 2019, pp. 1-8.
Vaswani et al., "Attention is all you need," In: NeurIPS, 2017, pp. 1-11.
Wagstaff et al., "Self-supervised scale recovery for monocular depth and egomotion estimation," 2021 IEEE/RSJ International Conference on Intelligent Robots and Systems (IROS), Prague, Czech Republic, 2021, pp. 2620-2627.
Wang et al., "Tartanair: A dataset to push the limits of visual slam," 2020 IEEE/RSJ International Conference on Intelligent Robots and Systems (IROS), Las Vegas, NV, USA, 2020, pp. 4909-4916.
Watson et al., "The Temporal Opportunist: Self-Supervised Multi-Frame Monocular Depth," Proceedings of the IEEE/CVF Conference on Computer Vision and Pattern Recognition (CVPR), 2021, pp. 1164-1174.
Wei et al., "Surrounddepth: Entangling surrounding views for self-supervised multi-camera depth estimation," Proceedings of The 6th Conference on Robot Learning, PMLR 205, 2023, pp. 539-549.
Wu et al., "Toward practical monocular indoor depth estimation," Proceedings of the IEEE/CVF Conference on Computer Vision and Pattern Recognition (CVPR), 2022, pp. 3814-3824.
Xiao et al., "Sun3d: A database of big spaces reconstructed using sfm and object labels," In: 2013 IEEE International Conference on Computer Vision, pp. 1625-1632.
Yang et al., "Depth anything: Unleashing the power of large-scale unlabeled data," Proceedings of the IEEE/CVF Conference on Computer Vision and Pattern Recognition (CVPR), 2024, pp. 10371-10381.
Yao et al., "MVSNet: Depth inference for unstructured multi-view stereo," In: Proceedings of the European Conference on Computer Vision (ECCV), 2018, pp. 767-783.
Yifan et al., "Input-level inductive biases for 3D reconstruction," Proceedings of the IEEE/CVF Conference on Computer Vision and Pattern Recognition (CVPR), 2022, pp. 6176-6186.
Yin et al., "Metric3D: Towards zero-shot metric 3d prediction from a single image," Proceedings of the IEEE/CVF International Conference on Computer Vision (ICCV), 2023, pp. 9043-9053.
Yin et al., "Towards accurate reconstruction of 3D scene shape from a single monocular image," in IEEE Transactions on Pattern Analysis and Machine Intelligence, vol. 45, No. 5, pp. 6480-6494.
Yuan et al., "New crfs: Neural window fully-connected crfs for monocular depth estimation," Proceedings of the IEEE/CVF Conference on Computer Vision and Pattern Recognition (CVPR), 2022, pp. 3916-3925.
Zhang et al., "Adding conditional control to text-to-image diffusion models," Proceedings of the IEEE/CVF International Conference on Computer Vision (ICCV), 2023, pp. 3836-3847.

(56) References Cited

OTHER PUBLICATIONS

Zhao et al., "Unleashing text-to-image diffusion models for visual perception," Proceedings of the IEEE/CVF International Conference on Computer Vision (ICCV), 2023, pp. 5729-5739.
Zhou et al., "Unsupervised learning of monocular depth estimation with bundle adjustment, super-resolution and clip loss," arXiv:1812.03368, 2018, pp. 1-11.
Zhou et al., "Unsupervised learning of depth and ego-motion from video," Proceedings of the IEEE Conference on Computer Vision and Pattern Recognition (CVPR), 2017, pp. 1851-1858.
Duan et al., "DiffusionDepth: Diffusion Denoising Approach for Monocular Depth Estimation," arXiv:2303.05021, Aug. 29, 2023, pp. 1-16.
Guizilini et al., "Towards Zero-Shot Scale-Aware Monocular Depth Estimation," Proceedings of the IEEE/CVF International Conference on Computer Vision (ICCV), 2023, pp. 9233-9243.
Ni et al., "Degeneration-Tuning: Using Scrambled Grid shield Unwanted Concepts from Stable Diffusion," MM '23: Proceedings of the 31st ACM International Conference on Multimedia, Oct. 2023, pp. 8900-8909.
Ye et al., "Graph Neural Diffusion Networks for Semi-supervised Learning," arXiv:2201.09698, Nov. 3, 2023, pp. 1-7.
Zhang et al., "Learning Unsupervised World Models for Autonomous Driving via Discrete Diffusion," arXiv:2311.01017, ICLR 2024, pp. 1-31.
Pan et al., "T-Stitch: Accelerating Sampling in Pre-Trained Diffusion Models with Trajectory Stitching," arXiv:2402.14167, Feb. 21, 2024, pp. 1-31.
Guizilini et al., "Full Surround Monodepth from Multiple Cameras," in IEEE Robotics and Automation Letters, vol. 7, No. 2, Apr. 2022, pp. 5397-5404.
Guizilini et al., "DeLiRa: Self-Supervised Depth, Light, and Radiance Fields," Proceedings of the IEEE/CVF International Conference on Computer Vision (ICCV), 2023, pp. 17935-17945.
Liu et al., "Swim Transformer V2: Scaling Up Capacity and Resolution," Proceedings of the IEEE/CVF Conference on Computer Vision and Pattern Recognition (CVPR), 2022, pp. 12009-12019.
Liu et al., "MeshDiffusion: Score-based Generative 3D Mesh Modeling," arXiv:2303.08133, ICLR 2023, pp. 1-26.
Yang et al., "Learning a Diffusion Prior for NeRFs," arXiv:2304.14473, ICLR 2023, pp. 1-9.
Kamewar et al., "HoloDiffusion: Training a 3D Diffusion Model using 2D Images," Proceedings of the IEEE/CVF Conference on Computer Vision and Pattern Recognition (CVPR), 2023, pp. 18423-18433.
Yin et al., "Towards Domain-agnostic Depth Completion," Machine Intelligence Research Jul. 29, 2022, pp. 1-23.
Bhat et al., "Adabins: Depth estimation using adaptive bins," Proceedings of the IEEE/CVF Conference on Computer Vision and Pattern Recognition (CVPR), 2021, pp. 4009-4018.
Bhat et al., "LocalBins: Improving Depth Estimation by Learning Local Distributions," ECCV 2022, pp. 1-19.
Bhat et al., "Zoedepth: Zero-shot transfer by combining relative and metric depth," arXiv:2302.12288, Feb. 23, 2023, pp. 1-20.
Cabon et al., "Virtual kitti 2," arXiv:2001.10773, Jan. 29, 2020, pp. 1-11.
Caesar et al., "nuscenes: A multimodal dataset for autonomous driving," Proceedings of the IEEE/CVF Conference on Computer Vision and Pattern Recognition (CVPR), 2020, pp. 11621-11631.
Chang et al., "On the design fundamentals of diffusion models: A survey," arXiv:2306.04542, Oct. 19, 2023, pp. 1-22.
Chawla et al., "Multimodal scale consistency and awareness for monocular self-supervised depth estimation," 2021 IEEE International Conference on Robotics and Automation (ICRA), Xi'an, China, 2021, pp. 5140-5146.
Chen et al., "A generalist framework for panoptic segmentation of images and videos," Proceedings of the IEEE/CVF International Conference on Computer Vision (ICCV), 2023, pp. 909-919.
Dai et al., "Richly-annotated 3d reconstructions of indoor scenes," Proceedings of the IEEE Conference on Computer Vision and Pattern Recognition (CVPR), 2017, pp. 5828-5839.
Dhariwal et al., "Diffusion models beat gans on image synthesis," In: NeurIPS, 2021, pp. 1-15.
Dong et al., "Towards real-time monocular depth estimation for robotics: A survey," in IEEE Transactions on Intelligent Transportation Systems, vol. 23, No. 10, Oct. 2022, pp. 16940-16961.
Eftekhar et al., "Omnidata: A scalable pipeline for making multi-task mid-level vision datasets from 3d scans," In: Proceedings of the IEEE/CVF International Conference on Computer Vision, 2021, pp. 10786-10796.
Eigen et al., "Predicting depth, surface normals and semantic labels with a common multi-scale convolutional architecture," Proceedings of the IEEE International Conference on Computer Vision (ICCV), 2015, pp. 2650-2658.
Eigen et al., "Depth map prediction using a multi-scale deep network," Advances in Neural Information Processing Systems 27 (NIPS 2014), pp.
Fu et al., "Deep ordinal regression network for monocular depth estimation," Proceedings of the IEEE Conference on Computer Vision and Pattern Recognition (CVPR), 2018, pp. 2002-2011.
Ganj et al., "Mobile ar depth estimation: Challenges & prospects—extended version," arXiv:2310.14437, 2023, pp. 1-9.
Geiger et al., "Vision meets robotics: The kitti dataset," The International Journal of Robotics Research, vol. 32, issue 11, 2013, pp. 1231-1237.
Geiger et al., "Are we ready for autonomous driving? the kitti vision benchmark suite," 2012 IEEE Conference on Computer Vision and Pattern Recognition, Providence, RI, USA, 2012, pp. 3354-3361.
Godard et al., "Digging into self supervised monocular depth prediction," Proceedings of the IEEE/CVF International Conference on Computer Vision (ICCV), 2019, pp. 3828-3838.
Gordon et al., "Depth from videos in the wild: Unsupervised monocular depth learning from unknown cameras," Proceedings of the IEEE/CVF International Conference on Computer Vision (ICCV), 2019, pp. 8977-8986.
Guizilini et al., "Multi-frame self-supervised depth with transformers," Proceedings of the IEEE/CVF Conference on Computer Vision and Pattern Recognition (CVPR), 2022, pp. 160-170.
Guizilini et al., "3D packing for self-supervised monocular depth estimation," Proceedings of the IEEE/CVF Conference on Computer Vision and Pattern Recognition (CVPR), 2020, pp. 2485-2494.
Guizilini et al., "Learning optical flow, depth, and scene flow without real-world labels," in IEEE Robotics and Automation Letters, vol. 7, No. 2, Apr. 2022, pp. 3491-3498.
Guizilini et al., "Geometric unsupervised domain adaptation for semantic segmentation," Proceedings of the IEEE/CVF International Conference on Computer Vision (ICCV), 2021, pp. 8537-8547.
Guizilini et al., "Depth field networks for generalizable multi-view scene representation," In: European Conference on Computer Vision, Springer 2022, pp. 245-262.
Guizilini et al., "Self-supervised depth, light, and radiance fields," Proceedings of the IEEE/CVF International Conference on Computer Vision (ICCV), 2023, pp. 17935-17945.
Gurram et al., "Monocular depth estimation through virtual-world supervision and real-world sfm self-supervision," in IEEE Transactions on Intelligent Transportation Systems, vol. 23, No. 8, pp. 12738-12751.
Hartley et al., "Multiple view geometry in computer vision," Cambridge university press, 2003, pp. 1-48.
Ho et al., "Denoising diffusion probabilistic models," In: NeurIPS, 2020, pp. 1-12.
Ho et al., "Cascaded diffusion models for high fidelity image generation," The Journal of Machine Learning Research vol. 23, issue 1, 2022, pp. 2249-2281.
Huang et al., "DeepMVS: Learning multi-view stereopsis," Proceedings of the IEEE Conference on Computer Vision and Pattern Recognition (CVPR), 2018, pp. 2821-2830.

(56) References Cited

OTHER PUBLICATIONS

Hussain et al., "RVMDE: Radar validated monocular depth estimation for robotics," Journal of Latex class files, vol. 14, No. 8, Aug. 2021, pp. 1-9.
Im et al., "DPSnet: End-to-end deep plane sweep stereo," arXiv:1905.00538, 2019, pp. 1-12.
Jabri et al., "Scalable adaptive computation for iterative generation," In: ICML, 2023, pp. 1-21.
Jaegle et al., "Perceiver IO: A general architecture for structured inputs & outputs," arXiv:2107.14795, 2021, pp. 1-29.
Ji et al., "Monoindoor: Towards good practice of self-supervised monocular depth estimation for indoor environments," Proceedings of the IEEE/CVF International Conference on Computer Vision (ICCV), 2021, pp. 12787-12796.
Ji et al., "Ddp: Diffusion model for dense visual prediction," Proceedings of the IEEE/CVF International Conference on Computer Vision (ICCV), 2023, pp. 21741-21752.

* cited by examiner

SYSTEMS AND METHODS FOR PREDICTING A DEPTH MAP USING DIFFUSION-BASED MODELING

CROSS-REFERENCE TO RELATED APPLICATIONS

This application claims the benefit of U.S. Provisional Application No. 63/561,479 filed on Mar. 5, 2024, which is herein incorporated by reference in its entirety.

TECHNICAL FIELD

The subject matter described herein relates, in general, to predicting a depth map from an image, and, more particularly, to predicting the depth map using a diffusion-based model and a geometric-based network through data conditioning.

BACKGROUND

Systems estimating depth for applications such as augmented reality (AR), medical imaging, automated driving, etc., encounter challenges. Applications mostly benefit from estimates having metric depth (i.e., meters) that capture the physical shape of the observed environment that is true-to-size and realistic. In this way, systems can reconstruct a three-dimensional environment that is scale-aware. Although recovering the metric depth using multi-view sources (e.g., stereo cameras) is feasible, systems using images from a lone camera (e.g., a monocular camera, a red-green-blue (RGB) camera, etc.) have difficulties with accurately estimating metric depth.

In various implementations, systems use a learning model that estimates depth using data from a monocular camera and learned priors from training data. In this way, the systems reason over scale ambiguity and generate accurate predictions. However, the priors can lack expressiveness to generalize across diverse domains for the depth estimates. Furthermore, systems using a learning model to detect and learn the priors may demand training data that is diverse and scaled. As such, training the learning model with sparse data can lead to inaccurate and erroneous depth estimates during implementation. This is particularly challenging when the learning model is tasked with predicting metric depth. Therefore, systems having a learning model that estimates depth from data derived using a lone camera can be inhibited by training data for computations involving scaling and predicting metric depth.

SUMMARY

In one embodiment, example systems and methods relate to estimating a depth map from an image using a diffusion model that efficiently learns in optimal computational spaces using a learning model and trains with sparse data. In various implementations, systems constructing views having depth information and metric measures (e.g., meters) using a single image rather than stereo imaging (i.e., multiple cameras) face problems from scale ambiguity. A learning model can reduce scale ambiguity through leveraging increasingly vast labeled and unlabeled datasets. This generates geometric priors that allow generating consistent predictions across various scenarios but can have computation costs that are elevated from acquiring labeled data. A diffusion-based learning model can also reduce effects from scaling errors due to the generality and scalability of learned representations. However, diffusion-based models that estimate depth demand ground-truths that are dense for predictions similar to image generation through diffusion. These ground-truths can be depth labels that are unavailable. Thus, systems estimating depth using an image acquired through a lone camera lack labeled data and priors for accurate and efficient computations through diffusion.

Therefore, in one embodiment, a prediction system infers a depth map from an image through learning physically-grounded priors using a geometric embedding and an image embedding that allows metric scaling derived with a learning model and a diffusion model. In particular, the prediction system estimates the depth map using the diffusion model that allows scalability for vast and diverse datasets lacking structure and training involving sparse data. This supports zero-shot transfer since the depth map is estimated for scenarios lacking and unobserved during training. The prediction system can also incorporate encodings for geometric positions that bridge domain gaps across datasets geometrically. In one approach, the prediction system conditions noise, an image embedding, and a geometric embedding (e.g., camera intrinsics, camera extrinsics, etc.) locally and globally with the learning model (e.g., a neural network) that improves performance for depth inferences across data ranges using the diffusion model. Here, the embeddings can be vectors having projected information and dimensionality information. The noise can be random noise inputted as an initial representation of the depth map. Furthermore, the image embedding can be structured into local tokens representing pixel-level information and global tokens that represent scene-level information that the diffusion model iteratively processes to complete the depth map. In this way, the prediction system efficiently and accurately estimates the depth map using diffusion at a pixel-level that allows metric scales regardless of having training data that is sparse and unstructured.

In one embodiment, a prediction system that estimates a depth map from an image using a diffusion model that efficiently learns in optimal computational spaces using a learning model and trains with sparse data is disclosed. The prediction system includes a memory storing instructions that, when executed by a processor, cause the processor to estimate a local vector for an image by combining random noise, an image embedding about the image, and a geometric embedding using a learning model, the local vector having depth information at a pixel-level for the image. The instructions also include instructions to predict a global vector by combining the image embedding and the geometric embedding at a scene-level by the learning model. The instructions also include instructions to infer a depth map of the image by combining the local vector and the global vector using a diffusion model.

In one embodiment, a non-transitory computer-readable medium for estimating a depth map from an image using a diffusion model that efficiently learns in optimal computational spaces using a learning model and trains with sparse data and including instructions that when executed by a processor cause the processor to perform one or more functions is disclosed. The instructions include instructions to estimate a local vector for an image by combining random noise, an image embedding about the image, and a geometric embedding using a learning model, the local vector having depth information at a pixel-level for the image. The instructions also include instructions to predict a global vector by combining the image embedding and the geometric embedding at a scene-level by the learning model. The instructions also include instructions to infer a depth map of the image by combining the local vector and the global vector using a diffusion model.

In one embodiment, a method for estimating a depth map from an image using a diffusion model that efficiently learns in optimal computational spaces using a learning model and trains with sparse data is disclosed. In one embodiment, the method includes estimating a local vector for an image by combining random noise, an image embedding about the image, and a geometric embedding using a learning model, the local vector having depth information at a pixel-level for the image. The method also includes predicting a global vector by combining the image embedding and the geometric embedding at a scene-level by the learning model. The method also includes inferring a depth map of the image by combining the local vector and the global vector using a diffusion model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
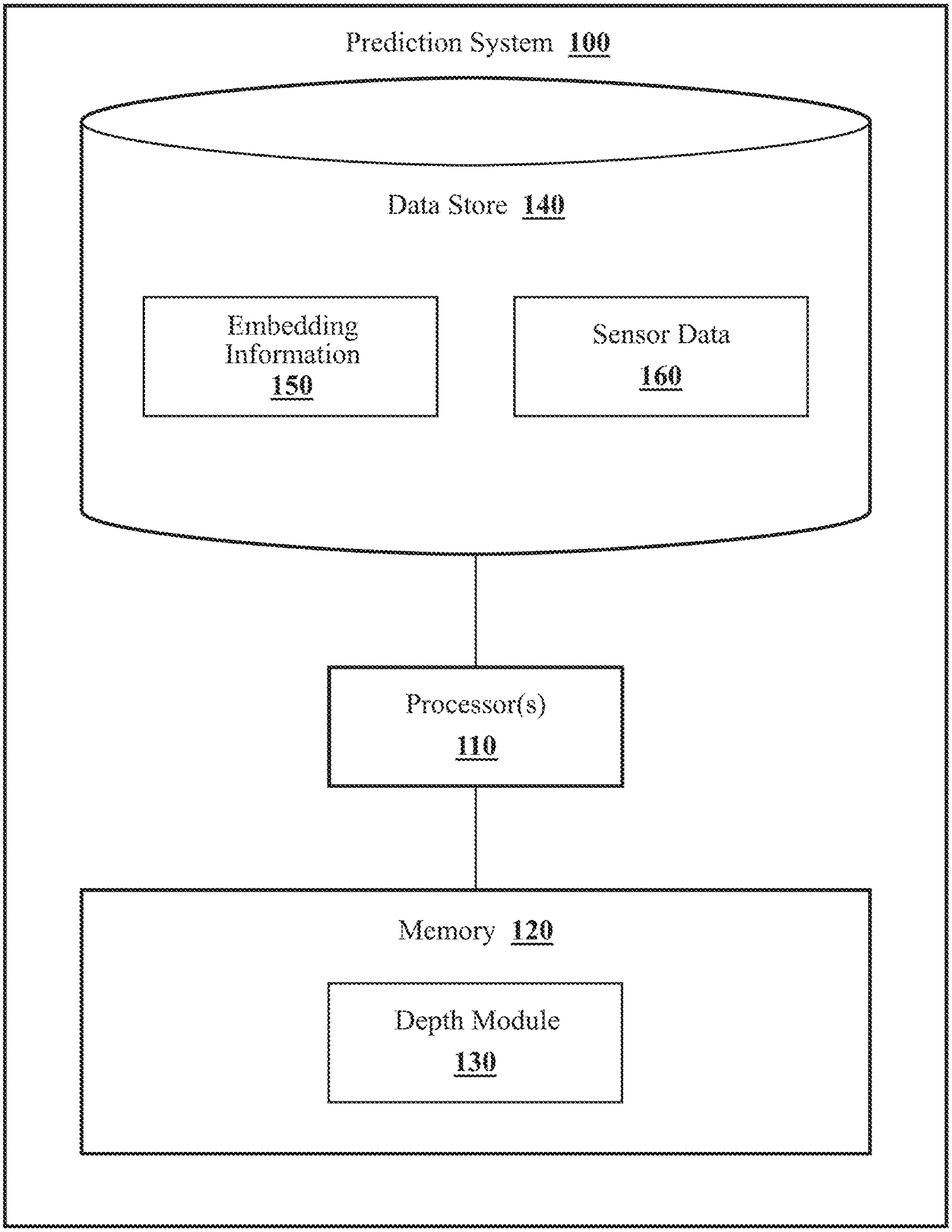
FIG. 1 illustrates one embodiment of a prediction system estimating a depth map using a diffusion model that efficiently learns within computational spaces using a learning model.

Systems, methods, and other embodiments associated with inferring a depth map using a diffusion model that processes locally and globally conditioned information of image embeddings, geometric embeddings, and noise generated from a learning model are disclosed herein. In various implementations, systems using diffusion for estimating depth from monocular imaging involve fragmented architecture and ad-hoc adaptations that hamper performance and demand intensive training. For example, diffusion through latent auto-encoders specially trained with focused and less diverse datasets lead to inaccuracies and decreased sharpness. Furthermore, ground-truths that are dense can be unavailable for real-world datasets. Other systems that are trained to infill through interpolating missing values and step-unrolling that adds noise to the model output rather than the ground-truth also can exhibit constrained performance and capabilities. For instance, the systems can encounter complex computations inferring a depth map having metric scaling through diffusion without acquiring training data that is diverse. Thus, systems estimating a depth map using data from a lone camera face difficulties from limited training data and complexity involving specialized architecture.

Therefore, in one embodiment, a prediction system infers a depth map using a learning model and a diffusion architecture that is flexible and efficient to operate at a pixel-level while training with sparse and unstructured data. In one approach, the diffusion model is a recurrent interface network (RIN) that decouples core computation from input dimensionality when processing image data acquired from a lone camera (e.g., a monocular camera, red-green-blue (RGB) camera, etc.). The RIN can also remove system restrictions demanding image data formed as dense grids having spatial structure. In this way, the RIN increases computational efficiency over diffusion architectures such as a u-network (U-Net model) and exhibits domain-agnostic properties through allowing depth estimates across diverse datasets. In one embodiment, the RIN has self-attention layers that iteratively process image features having geometric positions in three-dimensions (3D) outputted by a learning model (e.g., a neural network) to condition the diffusion process both globally and locally. In this way, the prediction system generates a depth map at a pixel-level without specialized encoding (e.g., auto-encoders) while exhibiting real scaling. As such, the prediction system infers a depth map using data from a lone camera in a metric scale and training with sparse data allowing zero-shot transfer, thereby exhibiting system robustness and diversity.

Moreover, in one embodiment, the prediction system estimates a local vector at a pixel-level for an image through combining random noise and a geometric embedding processed by the learning model. Here, the local vector can be a conditioned image embedding and the geometric embedding locally at pixel positions for the depth information. Embeddings can be vectors having projected information and dimensionality information formed to simplify parsing. For example, the image embedding has limited pixel data about objects within a shot. Meanwhile, the geometric embedding can be camera intrinsics (e.g., a focal length, a principal point, an aspect-ratio, etc.) defining the geometries for a camera and camera extrinsics having parameters that describe the camera relative to a reference frame. Furthermore, the learning model can predict a global vector by combining another image embedding about the image and the geometric embedding at a scene-level by the learning model. In this way, insights about a scene within an image are formed both locally and globally.

In various implementations, the prediction system forms tokens from the local and global vectors for simplifying processing by the diffusion model (e.g., a RIN). For instance, a token captures the contextual significance of an input element (e.g., a pixel) within a sequence that is derived through weighted aggregation from information associated with other elements. Regarding inferences, the diffusion model processes the random noise, local tokens, and global tokens to output noise representing a depth map. Diffusion of the local and global tokens continues with outputting noise until identifying a depth map that exhibits accurate features. In this way, the prediction system conditions the image locally and globally that allows the diffusion model to infer a depth map on a metric scale through combining information across varying datasets, thereby increasing system applicability and reliability.

Regarding training, the prediction system may acquire ground-truth depth about a monocular image having pixel data that is sparse and unstructured. The prediction system estimates a depth noise by a diffusion model (e.g., a RIN) combining injected noise and latent information with the ground-truth. Furthermore, the training involves calculating a loss as a difference between the depth noise and the injected noise and adapting the diffusion model with the loss. In one approach, the training reduces computation costs through removing an invalid subset of the pixel data by the diffusion model. Accordingly, the prediction system infers a depth map having a metric scale using data acquired from a camera through a diffusion model trained with sparse data and capable of diverse predictions.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

With reference to FIG. 1, one embodiment of the prediction system 100 is further illustrated. The prediction system 100 can include a processor(s) 110 and a memory 120 that stores a depth module 130. The memory 120 is a random-access memory (RAM), a read-only memory (ROM), a hard-disk drive, a flash memory, or other suitable memory for storing the depth module 130. The depth module 130 is, for example, computer-readable instructions that when executed by the processor(s) 110 cause the processor(s) 110 to perform the various functions disclosed herein.

The prediction system 100 as illustrated in FIG. 1 is generally an abstracted form. Furthermore, the depth module 130 generally includes instructions that function to control the processor(s) 110 to receive data inputs from a sensor (e.g., a camera). In one embodiment, the inputs represent observations of one or more objects in an environment proximate to a vehicle and/or other aspects about a surroundings. As provided for herein, the depth module 130, in one embodiment, acquires sensor data 160 that includes at least a camera image, such as an image captured by a monocular camera, a RGB camera, etc. In further arrangements, the depth module 130 acquires the sensor data 160 from further sensors such as a radar sensor, a light detection and ranging (LIDAR) sensor, etc., for locating and representing data about objects.

Moreover, in one embodiment, the prediction system 100 includes a data store 140. In one embodiment, the data store 140 is a database. The database is, in one embodiment, an electronic data structure stored in the memory 120 or another data store and that is configured with routines that can be executed by the processor(s) 110 for analyzing stored data, providing stored data, organizing stored data, and so on. Thus, in one embodiment, the data store 140 stores data used by the depth module 130 in executing various functions. In one embodiment, the data store 140 includes the sensor data 160 along with, for example, metadata that characterize various aspects of the sensor data 160. For example, the metadata can include location coordinates (e.g., longitude and latitude), relative map coordinates or tile identifiers, time/date stamps from when the separate sensor data 160 was generated, and so on. In one embodiment, the data store 140 further includes the embedding information 150 that includes vectors having projected information and dimensionality information. The embedding information 150 can include an image embedding derived from an image acquired using a lone camera (e.g., a monocular camera). For instance, the image embedding has pixel data that is sparse about objects within a view, a shot, etc. Meanwhile, the geometric embedding can be camera intrinsics and camera extrinsics. The camera intrinsics can include a focal length, a principal point, a pixel aspect-ratio, a skew, etc., defining the geometries for a camera. The camera extrinsics can include parameters that describe a position, an orientation, etc., of the camera relative to a reference frame.

Figure 2A:
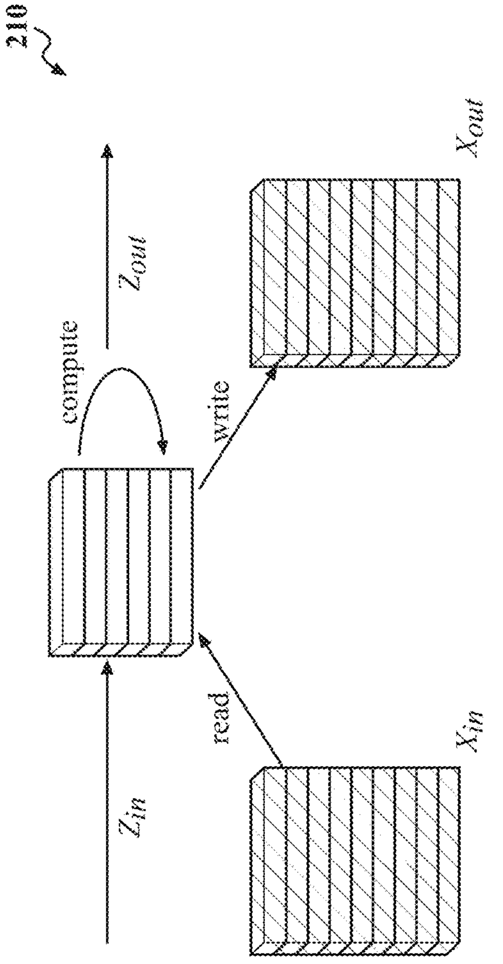
FIGS. 2A and 2B illustrate embodiments of training a recurrent interface network (RIN) for inferring the depth map through diffusion.
Figure 2B:
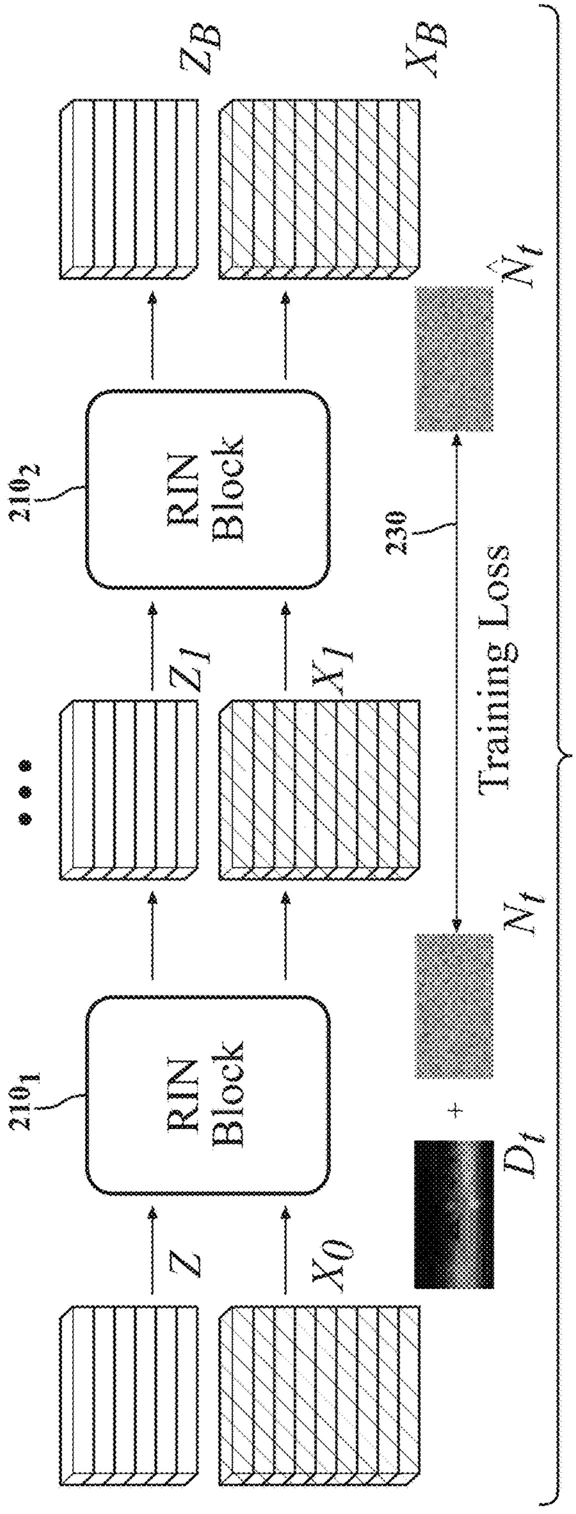

Now turning to FIGS. 2A and 2B, an embodiment of training a RIN for inferring a depth map through diffusion is illustrated. Here, a RIN operates as a diffusion model that efficiently trains using pixel data that is sparse and unstructured. For example, the RIN trains within a lower dimensionality space than an input space for an image. In this way, the RIN conducts expensive computations in lower dimensions and then projects results back to the input space that reduces computational costs.

In FIG. 2A, a RIN block 210 learns a latent space $Z_{in}$ by combining with input $X_{in}$ (e.g., pixel data) through read and write operations iteratively until converging upon an output. For example, $Z_{in}$ and $X_{in}$ are tokens processed by self-attention layers and written back to output tokens $X_{out}$. A self-attention layer can generate an output token capturing the contextual significance of an input element within a sequence that is derived through weighted aggregation from information associated with other elements. As previously explained, a token can capture the contextual significance of an input element within a sequence, such as a pixel. The contextual significance can be derived through weighted aggregation from information associated with other elements independent of input structure (e.g., spatial relationships), thereby increasing computational efficiency. Furthermore, the RIN block 210 can train efficiently using data subsets and dropping-out inputs that are invalid. In one approach, the RIN block 210 operates through a series of state transitions that are learned from a noise tensor $\epsilon$ to an image $x_0$ associated with a data distribution. To learn a transition f, a forward function can be defined as:

$$x_t = \sqrt{\gamma(t)}\,x_0 + \sqrt{1-\gamma(t)}\,\epsilon, \qquad \text{Equation (1)}$$

where $\epsilon \sim \mathcal{N}(0, I)$, $t \sim \mathcal{U}(0,1)$ and $\gamma(t)$ is a monotonically decreasing function. A learning network (e.g., a neural network) can learn to predict $\epsilon$ from $x_t$ for transition step t with:

$$\tilde{\epsilon} = f(x_t, t) = f\left(\sqrt{\gamma(t)}\,x_0 + \sqrt{1-\gamma(t)}\,\epsilon,\ t\right). \qquad \text{Equation (2)}$$

In one approach, Equation (2) involves sampling an image through a sequence of state transitions from $x_1=\epsilon$ to $x_0$ using small steps $x_1 \rightarrow x_{1-\Delta} \rightarrow \ldots \rightarrow x_0$. This can involve controlling diffusion through "conditioning" that adds directions for computations. For instance, the condition is an additional variable y that represents one of a class label, a language caption, and camera parameters that control outputs.

In FIG. 2B, a RIN model 220 adapts to predict a depth map while training with pixel data that is sparse. As another improvement, the RIN model 220 infers the depth map using image data represented by tokens and the image data lacks structure, such as a dense grid. The RIN model 220 can separate computations of input tokens $X \in \mathbb{R}^{N \times D}$ and latent tokens $Z \in \mathbb{R}^{M \times D}$. Here, $X \in \mathbb{R}^{N \times D}$ is derived from input data where N is dependent on input size and M is a fixed dimension. The RIN model 220 can execute a sequence of attention operations for training to infer a depth map. In one approach, the latent tokens Z attend to inputs X through a read operation followed by several self-attention computations on Z and the final write from latents to inputs forming a RIN block $\mathbf{210}_1$. Stacking the RIN block $\mathbf{210}_1$ with the RIN block $\mathbf{210}_2$ forms a deeper model that accurately and efficiently infers the depth map.

Regarding training details, the RIN model 220 can have a B number of RIN blocks where a block receives latent $Z_b$ and input $X_b$ tokens from a previous iteration and returns updated $Z_{b+1}$ and $X_{b+1}$ tokens. The RIN model 220 predicts injected noise $N(t)=\gamma(t)\in$ as depth noise $\hat{N}(t)$ using a ground-truth depth associated with an input image. Here, $t\sim\mathcal{U}(0,1)$ is the diffusion timestep given noisy inputs $X_0=D_i+N(t)$. The ground-truth depth can be acquired from real data, synthetic data, etc., and the prediction system 100 can generate depth embeddings from ground-truth labels. Here, embeddings are vectors having rich information about projected data and dimensionality from inputs that are readily parsable, thereby reducing computational costs.

The computations by the RIN model 220 can involve self-attention among the latent tokens Z that is independent of the input size N. As such, the RIN model 220 can train the transition function directly in the pixel space even for high-resolution and unstructured input X tokens within a low-dimensionality space, thereby reducing overall computational costs. As previously explained, the RIN model 220 can train through calculating a training loss 230 as a difference between the depth noise $\hat{N}(t)$ and the injected noise N(t). This can involve adapting parameters, weights, etc., for attention networks of the RIN block $\mathbf{210}_1$ with the RIN block $\mathbf{210}_2$ until converging upon a threshold for losses. Accordingly, the RIN model 220 trains to infer a depth map through diffusion and tokens at a pixel-level using pixel data that is sparse, thereby improving efficiency and robustness.

Figure 3:
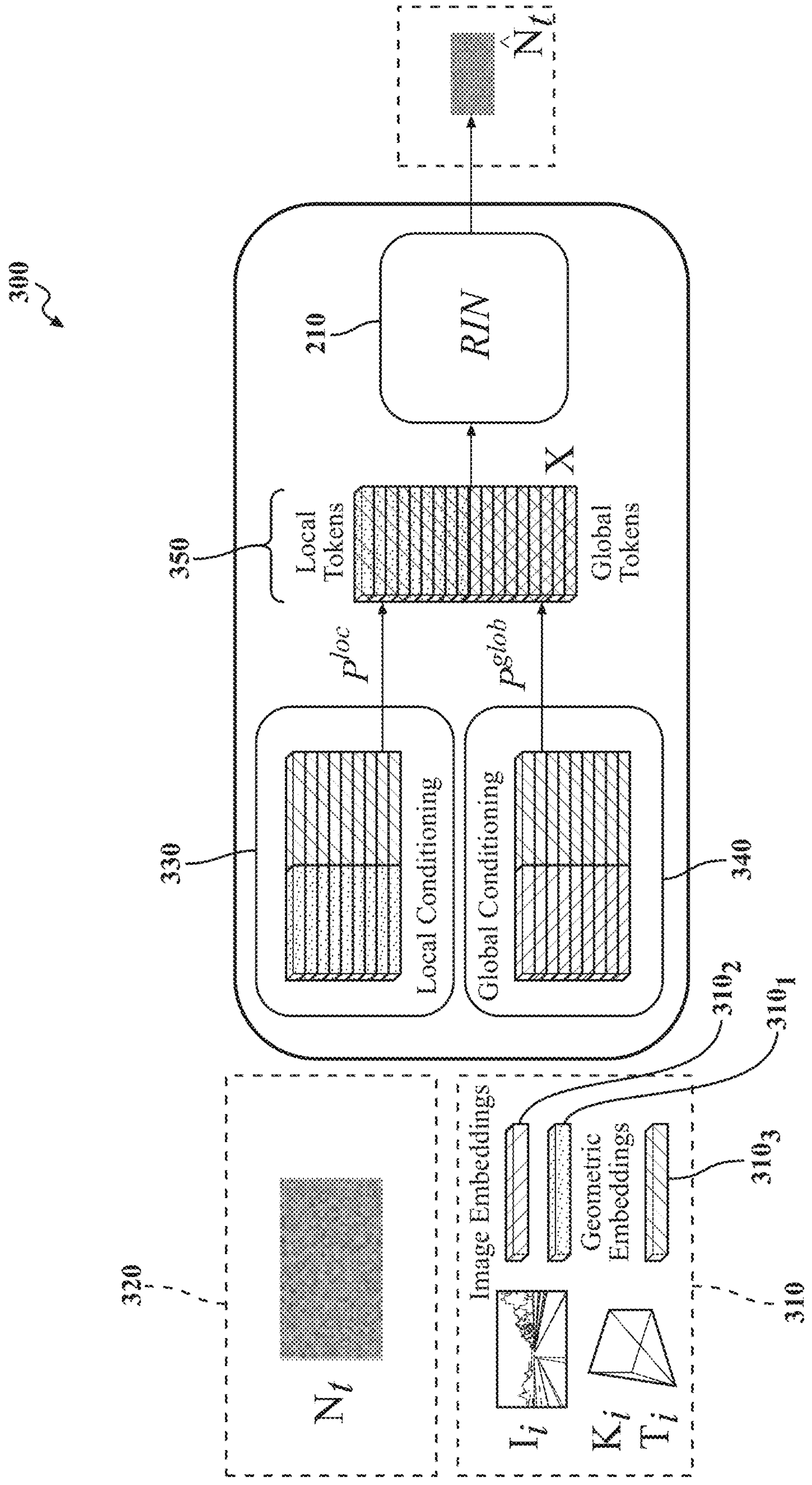
FIG. 3 illustrates one embodiment of the prediction system using a pipeline having a learning model and a diffusion model for estimating the depth map.

Now turning to FIG. 3, one embodiment of the prediction system 100 using a pipeline 300 having a learning model and a diffusion model for estimating a depth map is illustrated. Here, the prediction system 100 and/or the depth module 130 includes instructions that cause the processor 110 to estimate a local vector for an image by combining random noise and a geometric embedding using a learning model (e.g., a neural network) where the local vector has depth information at a pixel-level. The prediction system 100 predicts a global vector by combining an image embedding about the image and the geometric embedding at a scene-level by the learning model. In one approach, the depth module 130 infers a depth map of the image by combining the local vector and the global vector using a diffusion model. Although FIG. 3 references multiple embeddings, the prediction system 100 can infer a depth map from an image embedding representing an image and a geometric embedding representing camera parameters and variables. Furthermore, the prediction system 100 and the pipeline 300 can be interchangeable for descriptions about FIG. 3.

In FIG. 3, the RIN block 210 benefits from geometric information derived from the geometric embeddings as a source of priors using input 310. Here, the priors can be assumptions, constraints, etc., imposed on network parameters that influence learning and guide solutions that align with a prior knowledge, expectations, etc. In one approach, a geometric RIN (GRIN) receives the input 310 as a depth map $D_i\in\mathbb{R}^{H\times W}$ that is sparse and the input 310 has pixel-wise $d_{ijk}$ distances to a camera (e.g., a monocular camera, a RGB camera, etc.). As an improvement, the distances can be metric values representing physical distances that range between $d_s$ and $d_f$ for $j\in[0, H]$ and $k\in[0, W]$. Furthermore, depth can be represented as Euclidean depth having a distance along a viewing ray $r_{ijk}$. In this way, the RIN block 210 allows parameterizations for large-scale views through utilizing viewing rays that are individualized.

Moreover, $d_{ijk}$ can be missing and replaced with invalid values (e.g., zero) since $D_i$ is assumed to be sparse. As such, the pipeline 300 conditions the input 310 for diffusion on image data $I_i\in\mathbb{R}^{H\times W\times 3}$ acquired from a monocular camera, a RGB camera, etc., and corresponding camera intrinsics $K_i$ and extrinsics $T_i$. As previously explained, conditioning can involve controlling computations through adding parameters, constraints, etc. The camera intrinsics $K_i$ can include a focal length, a principal point, a pixel aspect-ratio, a skew, etc., defining camera geometries. The camera extrinsics $T_i$ can include parameters that describe a position, an orientation, etc., of the camera relative to a reference frame. The prediction system 100 can transform 3D points into a coordinate system of the camera using this camera information.

In the pipeline 300, the prediction system 100 can utilize an image and camera geometry formed within embeddings as input modalities that condition depth predictions. Here, the camera information conditioning diffusion allows inferring the depth map at a pixel-level rather than globally, thereby improving accuracy. The pipeline 300 can generate image embeddings $\mathbf{310}_1$ and $\mathbf{310}_2$ using an encoder $\mathcal{F}_\theta$ for the input 310 having the input image $I_i$. The encoding involves computing $F_i=\mathcal{F}_\theta(I_i)$ having learnable parameters θ. In one approach, the pipeline 300 forms tokens from the image $I_i$ using a single convolutional layer $\mathcal{F}\ \mathcal{F}_\theta^{loc}$ with kernel size K×K and $C_l$ output channel dimensions. An output can be a flattened $F_i^{loc}\in\mathbb{R}^{HW\times C_l}$ feature map containing patch-wise visual information $f_{ijk}$ for a pixel $p_{ijk}=(u, v)_{jk}$ within the image $I_i$.

The pipeline 300 can also generate geometric embeddings $\mathbf{310}_3$ using information from the camera used to obtain the image $I_i$. For example, the pixel $p_{ijk}$ from the image $I_i$ is parameterized from a camera center $t_i=[x_i, y_i, z_i]$ and viewing ray $r_{ijk}=(K_iR_i)^{-1}[u_{jk}, v_{jk}, 1]^T$ assuming that $K_i$ is a 3×3 matrix and $T_i$ a 4×4 matrix. Increasing expressiveness can involve Fourier encoding values with a mapping of:

$$\mathcal{E}(x)\mapsto[x, \sin(f_1\pi x), \cos(f_1\pi x), \ldots, \sin(f_N\pi x), \cos(f_N\pi x)]^T. \quad \text{Equation (3)}$$

Here, N can be the number of encoding frequencies equally spaced between $$\left[1, \frac{\mu}{2}\right].$$

Assuming $N_o$ frequencies for camera centers and $N_r$ for viewing rays, the geometric embeddings $\mathbf{310}_3$ can exhibit dimensionality $D=2(3(N_o+1)+3(N_r+1))=6(N_o+N_r+2)$.

The pipeline 300 can utilize the geometric embeddings $\mathbf{310}_3$ within $g_{ijk}=\mathcal{G}(t_i, r_{ijk})=\varepsilon(t_i)\oplus\varepsilon(r_{ijk})$ to imbue visual information with geometric awareness. As such, the pipeline 300 derives features capable of reasoning over 3D properties such as physical shape and scale. Accordingly, the prediction system 100 through the pipeline 300 can implicitly infer multi-view geometry and zero-shot transfer (e.g., scenarios lacking training) of metric depth across atypical datasets and camera geometries that are diverse using image data derived from a lone camera (e.g., a monocular camera, a RGB camera, etc.).

In various implementations, the GRIN operates at a pixel-level without latent auto-encoders and the GRIN uses defined tokenizers that simplify computations. As further explained below, the prediction system 100 uses depth embeddings from a ground truth about the input image during training since inferring depth maps can involve range intervals that are vast. In one approach, the prediction system 100 can independently verify a log-scale parameterization using projection and unprojection functions mapping $d_{ijk}$ to and from log-space $\hat{d}_{ijk}$ as:

$$\hat{d}_{ijk} = \log_b\left((b-1)\frac{d_{ijk}-d_s}{d_f-d_s}+1\right),\ d_{ijk} = \frac{b^{\hat{d}_{ijk}}-1}{b-1}(d_f-d_s)+d_s. \quad \text{Equation (4)}$$

Here, b is the logarithm base determining compression of distances at different ranges. In this way, the prediction system 100 through training makes shorter ranges robust to residual noise from the diffusion process while maintaining performance at longer ranges where the residual noise is less impactful.

Regarding conditioning, local conditioning 330 prepares the image embeddings 310$_1$ and the geometric embeddings 310$_3$ for diffusion through conditioning. The pipeline 300 can improve depth estimates with local conditioning through adding depth information that is unavailable at certain pixels when the image embedding 310$_1$ has sparse and unstructured image data. In one approach, the local conditioning 330 concatenates corresponding tokens for the embeddings denoted by the symbol ⊕. Here, the pipeline 300 implements geometric embeddings 310$_3$ as $g_{ijk}$ describing a pixel in a 3D reference frame rather than a two dimensional (2D) location within the image $I_i$. In this way, the diffusion focuses upon localized predictions for a depth map and promotes disambiguation between camera geometries (e.g., focal length, resolution, or distortion). In another approach, the conditioned vector is defined as $$\hat{d}_{ijk} = d_{ijk} \otimes f_{ijk}^{loc} \otimes g_{ijk}$$

for a one-dimensional prediction $d_{ijk} \in \mathbb{R}$ that is projected onto a V-dimensional vector $v_{ijk}$ using a linear layer $\mathcal{P}\ \mathcal{P}^{loc}_{1+C_l+D\rightarrow V}$. Accordingly, the local conditioning 330 outputs conditioned vectors for possible HW predictions estimated during diffusion as $V^{loc} \in \mathbb{R}^{HW\times V}$ and represented with $\mathcal{P}^{loc}$.

Regarding the global conditioning 340, image embeddings 310$_2$ are generated using a convolutional encoder $\mathcal{F}\ \mathcal{F}_\theta^{\text{glob}}$ resulting in multi-scale feature maps $$F_i^{glob} = [F_i^0, F_i^1, \ldots, F_i^S]$$

at S increasingly lower resolutions, thereby differing from the image embeddings 310$_1$. To combine multi-scale information, lower-resolution feature maps are upsampled, concatenated, and flattened for generating $$\hat{F}_i^{glob} \in \mathbb{R}^{\frac{HW}{d^2}\times C_g}.$$

Here, d is the downsampling factor of the highest encoded resolution and $C_g$ is the concatenated channel-wise dimension. In one approach, the image embeddings 310$_2$ contain image data that is multi-resolution, multi-scale, and scene-level yet dense. Although lacking pixel-level prediction for depth like the image embeddings 310$_1$ about scene objects, the image embeddings 310$_2$ can promote global consistency independent of depth during diffusion.

Moreover, the global conditioning 340 can incorporate spatial structure through combining image $$\hat{F}_i^{glob}$$

and geometric embeddings $G_i$. Here, the pipeline 300 can generate the geometric embeddings 310$_3$ from a camera resized to match resolution of the image embeddings 310$_2$. The pipeline 300 may concatenate embeddings projected onto V-dimensional vectors using a linear layer $$\mathcal{P}^{glob}_{C_g+D\rightarrow V}.$$

The collection of M vectors used to globally condition the diffusion process can be given by $V^{glob} \in \mathbb{R}^{M\times V}$ and represented with $\mathcal{P}^{glob}$.

Upon completing conditioning, the RIN block 210 receives the input tokens $X=V^{loc}\oplus V^{glob} \in \mathbb{R}^{(N+M)\times V}$ and random noise $N_t$ 320 (e.g., Gaussian noise) representing an initial depth map for the image $I_i$. Here, $V^{loc}$ can be concatenated with $V^{glob}$ as grouped tokens 350 that the RIN block 210 processes to predict noise across possible local tokens and output $\hat{N}_t$ as a depth map. In one approach, the prediction system 100 infers the depth map having the grouped tokens 350 representing pixels excluding information about spatial structure for objects within the image $I_i$. The grouped tokens 350 can be in a series having a group of local tokens and a group of global tokens for simplifying computations. Furthermore, the RIN block 210 can run several times for predicting and removing noise using multiple sub-RIN blocks similar to that illustrated in FIG. 2B. Over time, the depth map $\hat{N}_t$ develops as an accurate representation of depth at a pixel-level through diffusion computations that are efficient even with sparse and unstructured pixel data within the image $I_i$.

Now discussing training within the context of the pipeline 300, the prediction system 100 can incorporate the geometric embeddings 310$_3$ as the spatial structure for conditioning inputs associated with tokens. Once incorporated, a token can be treated independently for structure. This property can allow the RIN block 210 to ingest training data that is sparse through simply discarding invalid information and operating on valid tokens that are remaining. In this way, the RIN block 210 can promote pixel-level training and inference that is efficient when combined with computational bottlenecks provided by latent tokens.

Moreover, valid and conditioned vectors can be $\hat{V}^{loc} \in \mathbb{R}^{N\times V}$ assuming a ground-truth in a 2D grid $D_i \in \mathbb{R}^{H\times W}$ with $N<HW$ valid pixels. A depth embedding that is valid can be conditioned using an original 2D location defining a viewing ray as well as a corresponding image patch. Furthermore, global conditioning during training can mitigate decreasing information available for conditioning from valid image pixels without depth labels being discarded. For example, few remaining pixels can be available for conditioning with sparse depth labels (N<<HW) that destroy scene structure. The sky is an example of a structure having few depth labels that are valid during supervised training. As such, global conditioning can train with unstructured sparse data while still maintaining scene-level information that is dense.

In one embodiment, a $\hat{V}^{loc}$ matrix exhibits a varying length N during training as pixels with missing depth information are discarded (i.e., $d_{ijk}=0$). The pipeline 300 can improve iteration speed through randomly discarding a percentage of local vectors that are valid and supervising a subset of L pixels, such as through data dropout. This can lead to faster cross-attention with latent tokens from the RIN block 210. Similarly, discarding information from global vectors can improve iteration speeds and overall performance. As such, resulting input tokens can be of dimensionality $\hat{X} \in \mathbb{R}^{(L+G)\times V}$. For depth estimation using data from a lone camera (e.g., a monocular camera, an RGB camera, etc.), the pipeline 300 conditions one image $I_i$ globally resulting in $$V^{glob} = V_i^{glob}$$

compared with stereo cameras that assume two images $I_i$ and $I_j$ resulting in $$V^{glob} = V_i^{glob} \oplus V_j^{glob},$$

thereby increasing efficiency.

A training objective of the pipeline 300 can involve minimizing an L2 loss. Here, the L2 loss can be a squared loss, a mean squared error (MSE) loss, etc., that measures the average squared difference between the actual and predicted values. In one approach, the pipeline 300 trains in a log-depth scale such that $\mathcal{L}(t)=(\epsilon\gamma(t)-\bar{\epsilon})^2$. In this equation, $\epsilon \sim \mathcal{N}(0)$ can be injected noise at timestep $t \sim \mathcal{U}(0,1)$ and $\bar{\epsilon}$ is the predicted noise by the RIN block 210 at a timestep. Therefore, the pipeline 300 trains to efficiently infer a depth map using data from a lone camera in a metric scale and sparse and unstructured data through conditional diffusion, thereby promoting system reliability and robustness.

Figure 4:
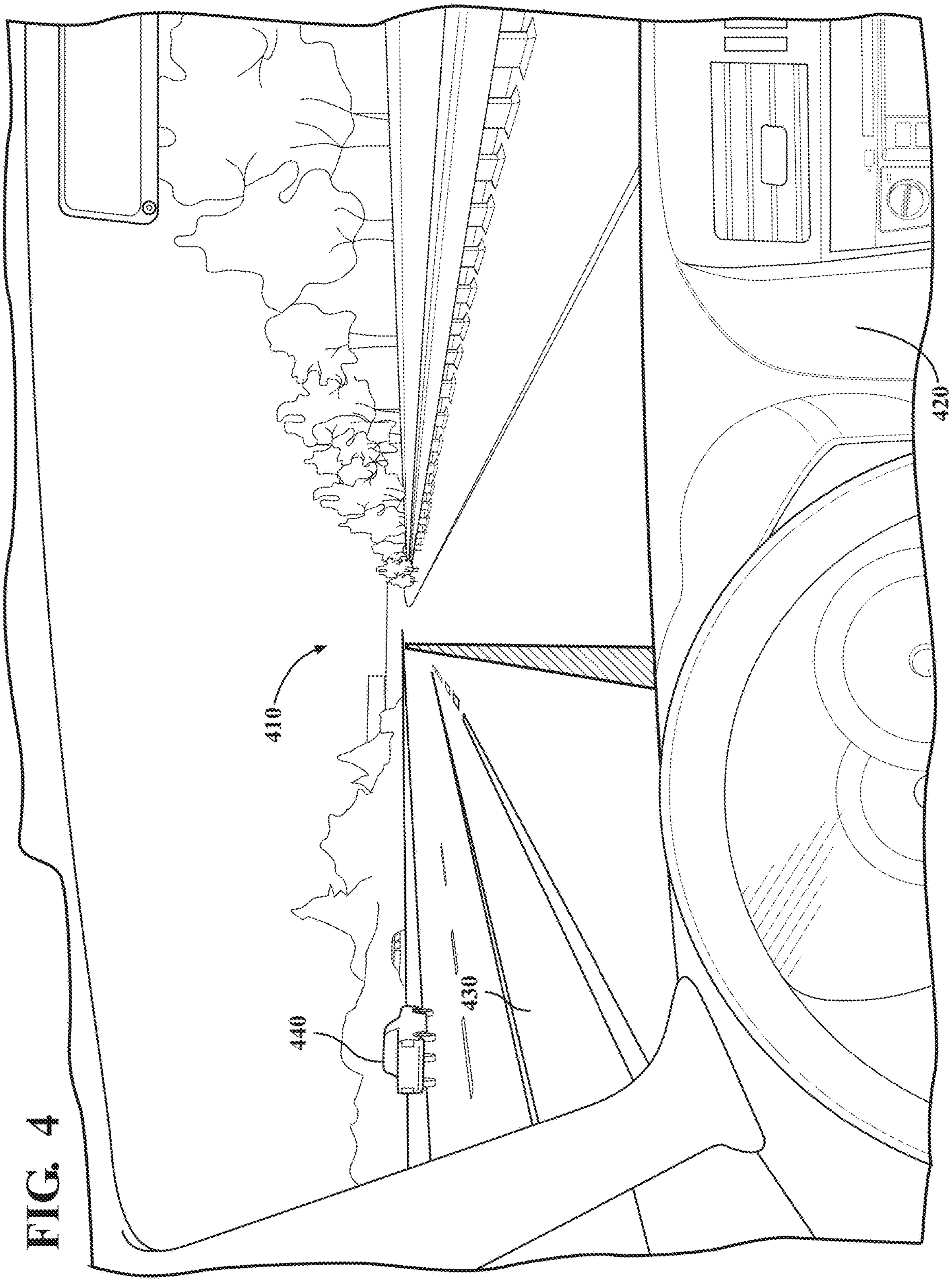
FIG. 4 illustrates an example of inferring the depth map through diffusion within a vehicle environment.

Turning to FIG. 4, one embodiment of inferring a depth map through diffusion by the prediction system 100 within a vehicle environment 410 is illustrated. Here, a vehicle 420 is merging onto a road having a median 430 and the pickup truck 440 to the left. The vehicle 420 uses one of a monocular camera, a RGB camera, etc., to capture the vehicle environment 410 and stores resulting image data in the sensor data 160. In one approach, the prediction system 100 runs on the vehicle 420 and estimates a local vector for the image data through combining random noise and a geometric embedding using a learning model. The local vector can have depth information at a pixel-level for the image data. Furthermore, the prediction system 100 predicts a global vector by combining an image embedding about the image data and the geometric embedding at a scene-level by the learning model. For inferring the depth map, the depth module 130 may combine the local vector and the global vector using a diffusion model. In this way, the vehicle 420 efficiently derives a depth map that is accurate and reliable for executing downstream tasks such as automated driving, object detection, etc.

Figure 5:
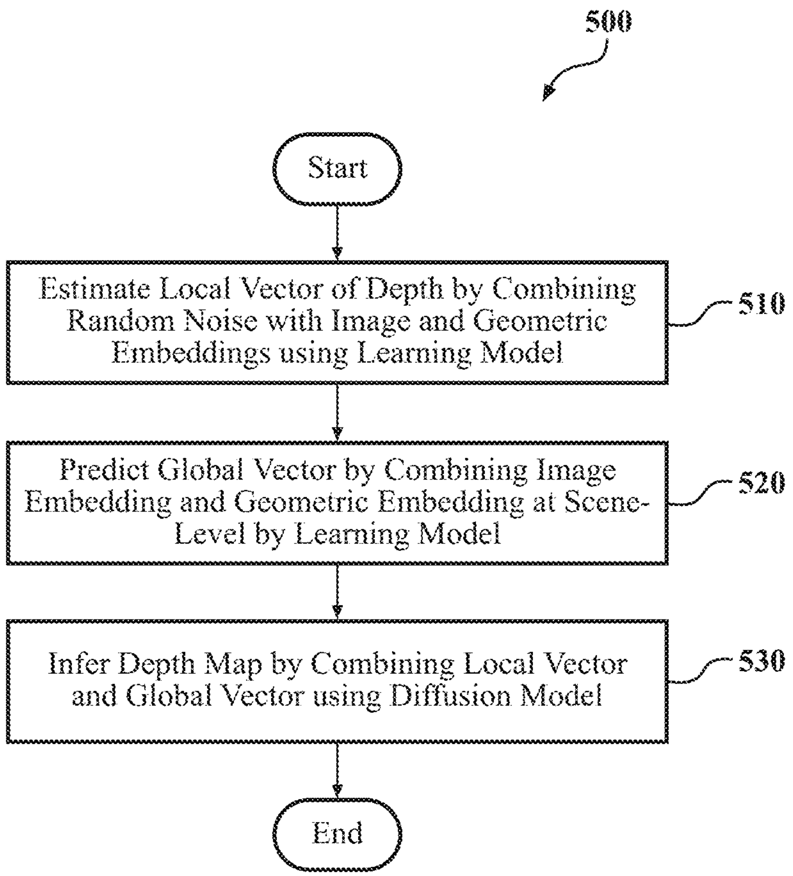
FIG. 5 illustrates one embodiment of a method that is associated with inferring a depth map of an image by combining a local vector and a global vector using the diffusion model.

Regarding FIG. 5, a flowchart of a method 500 that is associated with inferring a depth map of an image by combining a local vector and a global vector about the image using a diffusion model is illustrated. The method 500 will be discussed from the perspective of the prediction system 100 of FIG. 1. While the method 500 is discussed in combination with the prediction system 100, it should be appreciated that the method 500 is not limited to being implemented within the prediction system 100 but is instead one example of a system that may implement the method 500.

At 510, the prediction system 100 estimates a local vector of depth for an image by combining random noise with an image embedding and a geometric embedding using a learning model. The image embedding can have pixel data about the image that is sparse about objects within a view, a shot, etc. The geometric embedding can be camera intrinsics and camera extrinsics. As previously explained, the camera intrinsics can include a focal length, a principal point, a pixel aspect-ratio, a skew, etc., defining the geometries for a camera (e.g., a monocular camera, a RGB camera, etc.). The camera extrinsics can include parameters that describe a position, orientation, etc., of the camera relative to a reference frame.

Moreover, the local vector represents pixel-level depth through the learning model (e.g., a neural network) locally conditioning the image embedding with the geometric embedding. In one approach, conditioning involves controlling diffusion through adding a variable for sampling, such as a class label, a language caption, camera parameters, etc. Local conditioning prepares the image embedding and the geometric embedding for diffusion through adding depth information that is unavailable at certain pixels. Depth information may particularly be unavailable when the image embedding has sparse and unstructured data.

In one embodiment, the local conditioning concatenates corresponding tokens for the image embedding and the geometric embedding token-by-token. The prediction system 100 can simplify parsing by the learning model with forming embeddings representing vectors having projected information and dimensionality information. As previously explained, a token captures contextual significance of an input element (e.g., a pixel) within a sequence that is derived through weighted aggregation from information associated with other elements. In another approach, the prediction system 100 generates the geometric embedding to describe a pixel in a 3D reference frame rather than a 2D location within the image. In this way, diffusion focuses upon localized predictions for a depth map that reduces ambiguity between camera geometries for an image token, thereby improving system robustness.

At 520, the prediction system 100 predicts a global vector through combining the image embedding and the geometric embedding at a scene-level by the learning model. Here, the learning model globally conditions the image embedding and the geometric embedding to predict the global vector that incorporates spatial structure about the image. For example, image embeddings are generated using a convolutional encoder resulting in multi-scale feature maps at increasingly lower resolutions during global conditioning. To combine this multi-scale information, lower-resolution feature maps are up-sampled and concatenated for completeness. In this way, the image embeddings contain image data that is multi-resolution, multi-scale, and scene-level yet dense within the global vector. This enhances global consistency independent of depth during diffusion for corresponding image embeddings token-by-token.

At 530, the depth module 130 infers a depth map of the image by combining the local vector and the global vector using a diffusion model. In various implementations, the diffusion model is a RIN that processes the random noise, local tokens, and global tokens and outputs noise representing a depth map. As previously explained, diffusion of the local and global tokens continues with outputting noise until identifying a depth map through convergence. For example, RIN executes attention operations using latent tokens that attend to inputted local tokens and global tokens through a read operation. The RIN can include stacked RIN blocks for forming a deeper model that infers the depth map. Furthermore, the read operation is followed by several self-attention computations on outputs and the final write from latents to inputs.

In one approach, the prediction system 100 groups tokens representing pixels and scene level information within the image using the local and global tokens. For example, the grouped tokens are in a series having a group for the local tokens and a group for the global tokens that simplifies computations through organization. The grouped tokens can include sparse geometric information but exclude information about spatial structure for objects within a scene. Furthermore, the RIN can run several times using the grouped tokens for predicting and removing noise to identify the depth map. In one approach, the depth map develops as an accurate representation of depth at a pixel-level through diffusion computations that are efficient regardless of sparse and unstructured pixel data derived from the image. Accordingly, the prediction system 100 implements diffusion using a RIN and locally and globally conditioned embeddings about an image from a lone camera, thereby improving depth map inferences.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system comprising:

a memory storing instructions that, when executed by a processor, cause the processor to:

estimate a local vector for an image by combining random noise, an image embedding about the image, and a geometric embedding using a learning model, the local vector having depth information at a pixel-level for the image;

predict a global vector by combining the image embedding and the geometric embedding at a scene-level by the learning model; and infer a depth map of the image by combining the local vector and the global vector using a diffusion model.

2. The prediction system of claim 1 further including instructions to:

estimate a depth noise by the diffusion model combining injected noise, latent information, and a ground-truth depth associated with picture data, wherein the diffusion model is a recurrent interface network (RIN) and the picture data has pixel data that is sparse;

calculate a loss as a difference between the depth noise and the injected noise; and train the diffusion model with the loss.

3. The prediction system of claim 2 further including instructions to:

remove an invalid subset of the pixel data by the diffusion model using dropout.

4. The prediction system of claim 1 further including instructions to:

input the depth map as noise to the learning model; and alter the depth map by the diffusion model using local tokens at the pixel-level and global tokens, wherein the diffusion model is a recurrent interface network (RIN) having self-attention layers that iteratively process the local tokens and the global tokens.

5. The prediction system of claim 1, wherein the instructions to estimate the local vector further include instructions to:

condition the image embedding and the geometric embedding locally at pixel positions for the depth information, wherein the image embedding and the geometric embedding are vectors having projected information and dimensionality information.

6. The prediction system of claim 1, wherein the instructions to predict the global vector further include instructions to:

condition the image embedding and the geometric embedding globally independent from localized depth.

7. The prediction system of claim 1, wherein the instructions to infer the depth map further include instructions to:

generate tokens representing the local vector and the global vector, wherein the tokens are pixels excluding information about spatial structure for objects within the image; and concatenate the tokens in a series having local tokens that are grouped and global tokens that are grouped.

8. The prediction system of claim 1, wherein the global vector has the image embedding and the geometric embedding at the scene-level across multiple scales of the image.

9. The prediction system of claim 1, wherein the diffusion model is a recurrent interface network (RIN) that operates within a dimensionality space that is reduced and the RIN factors camera extrinsics and camera intrinsics from the geometric embedding.

10. A non-transitory computer-readable medium comprising:

instructions that when executed by a processor cause the processor to:

estimate a local vector for an image by combining random noise, an image embedding about the image, and a geometric embedding using a learning model, the local vector having depth information at a pixel-level for the image;

predict a global vector by combining the image embedding and the geometric embedding at a scene-level by the learning model; and infer a depth map of the image by combining the local vector and the global vector using a diffusion model.

11. The non-transitory computer-readable medium of claim 10 further including instructions to:

estimate a depth noise by the diffusion model combining injected noise, latent information, and a ground-truth depth associated with picture data, wherein the diffusion model is a recurrent interface network (RIN) and the picture data has pixel data that is sparse;

calculate a loss as a difference between the depth noise and the injected noise; and train the diffusion model with the loss.

12. A method comprising:

estimating a local vector for an image by combining random noise, an image embedding about the image, and a geometric embedding using a learning model, the local vector having depth information at a pixel-level for the image;

predicting a global vector by combining the image embedding and the geometric embedding at a scene-level by the learning model; and inferring a depth map of the image by combining the local vector and the global vector using a diffusion model.

13. The method of claim 12 further comprising:

estimating a depth noise by the diffusion model combining injected noise, latent information, and a ground-truth depth associated with picture data, wherein the diffusion model is a recurrent interface network (RIN) and the picture data has pixel data that is sparse;

calculating a loss as a difference between the depth noise and the injected noise; and training the diffusion model with the loss.

14. The method of claim 13 further comprising:

removing an invalid subset of the pixel data by the diffusion model using dropout.

15. The method of claim 12 further comprising:

inputting the depth map as noise to the learning model; and altering the depth map by the diffusion model using local tokens at the pixel-level and global tokens, wherein the diffusion model is a recurrent interface network (RIN) having self-attention layers that iteratively process the local tokens and the global tokens.

16. The method of claim 12, wherein estimating the local vector further includes:

conditioning the image embedding and the geometric embedding locally at pixel positions for the depth information, wherein the image embedding and the geometric embedding are vectors having projected information and dimensionality information.

17. The method of claim 12, wherein predicting the global vector further includes:

conditioning the image embedding and the geometric embedding globally independent from localized depth.

18. The method of claim 12, wherein inferring the depth map further includes:

generating tokens representing the local vector and the global vector, wherein the tokens are pixels excluding information about spatial structure for objects within the image; and concatenating the tokens in a series having local tokens that are grouped and global tokens that are grouped.

19. The method of claim 12, wherein the global vector has the image embedding and the geometric embedding at the scene-level across multiple scales of the image.

20. The method of claim 12, wherein the diffusion model is a recurrent interface network (RIN) that operates within a dimensionality space that is reduced and the RIN factors camera extrinsics and camera intrinsics from the geometric embedding.

* * * * *